(12) United States Patent
Karppanen (10) Patent No.: US 10,025,702 B1
(45) Date of Patent: Jul. 17, 2018

(54) BROWSER CAPABLE OF SAVING AND RESTORING CONTENT ITEM STATE

(71) Applicant: Amazon Technologies, Inc., Seattle, WA (US)

(72) Inventor: Jari Juhani Karppanen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 14/566,335

(22) Filed: Dec. 10, 2014

(51) Int. Cl.
*G06F 17/22* (2006.01)
*G06F 12/02* (2006.01)
*G06F 17/30* (2006.01)
*G06F 12/0891* (2016.01)

(52) U.S. Cl.
CPC ........ *G06F 12/023* (2013.01); *G06F 12/0891* (2013.01); *G06F 17/30902* (2013.01); *G06F 2212/1041* (2013.01); *G06F 2212/222* (2013.01); *G06F 2212/608* (2013.01)

(58) Field of Classification Search
CPC ...... G06F 9/548; G06F 12/0831; G06F 9/526; G06F 12/023; G06F 17/30902; G06F 12/0891; G06F 2212/1041; G06F 2212/222; G06F 2212/608
See application file for complete search history.

(56) References Cited

U.S. PATENT DOCUMENTS

| | | | |
|---|---|---|---|
| 6,298,353 B1 * | 10/2001 | Apte | G06F 8/71 |
| 6,477,701 B1 * | 11/2002 | Heistermann | G06F 9/465 |
| | | | 707/999.202 |
| 6,993,540 B2 * | 1/2006 | Hudson | G06F 12/0269 |
| 7,721,042 B2 * | 5/2010 | Cypher | G06F 12/0607 |
| | | | 365/189.011 |
| 8,196,112 B1 * | 6/2012 | Cansizlar | G06F 11/3672 |
| | | | 717/116 |
| 8,775,923 B1 | 7/2014 | Kroeger et al. | |
| 9,069,477 B1 * | 6/2015 | Overton | G06F 3/0641 |
| 2002/0087786 A1 * | 7/2002 | Burton | G06F 3/0605 |
| | | | 711/112 |
| 2002/0126673 A1 * | 9/2002 | Dagli | H04L 47/10 |
| | | | 370/392 |
| 2004/0098544 A1 * | 5/2004 | Gaither | G06F 12/023 |
| | | | 711/154 |
| 2004/0123239 A1 * | 6/2004 | Roessler | G06F 17/30899 |
| | | | 715/744 |
| 2007/0150556 A1 * | 6/2007 | Fukuda | G06F 17/3089 |
| | | | 709/219 |
| 2007/0174300 A1 | 7/2007 | Kim | |

(Continued)

*Primary Examiner* — Maikhanh Nguyen (74) *Attorney, Agent, or Firm* — Knobbe, Martens, Olson & Bear, LLP (57) ABSTRACT

Features are disclosed for storing content items, such as content pages, applications, and other network-accessible content, such that changes to the state of the content items may be retained and restored at a later time. Storing content items can include serializing the memory state of individual portions of the content items to a persistent storage medium based on a determination that the memory state has changed since the last serialization process. The serialized content items may later be de-serialized and restored to the same memory state that they had prior to serialization. In this way, the de-serialized content items reflect changes made after they were initially retrieved and prior to serialization.

13 Claims, 5 Drawing Sheets

(56) References Cited

U.S. PATENT DOCUMENTS

| | | | |
|---|---|---|---|
| 2008/0046869 A1* | 2/2008 | Lambert | G06F 9/4435 717/136 |
| 2009/0204718 A1* | 8/2009 | Lawton | G06F 9/5016 709/230 |
| 2010/0223432 A1* | 9/2010 | Eidus | G06F 12/109 711/148 |
| 2011/0161619 A1* | 6/2011 | Kaminski | G06F 9/5016 711/207 |
| 2011/0289141 A1* | 11/2011 | Pletter | G06F 17/30575 709/203 |
| 2013/0041986 A1* | 2/2013 | Colton | G06F 8/30 709/219 |

* cited by examiner

BROWSER CAPABLE OF SAVING AND RESTORING CONTENT ITEM STATE

BACKGROUND

Many network content browser applications (also referred to simply as "browsers") allow multiple content items to be open concurrently. For example, users can open multiple browser windows or browser instances, with each window corresponding to a different content item, a different instance of the same content item, or some combination thereof. Each browser instance is typically managed as a separate process on a user computing device, with its own separate memory space in which objects of the content page are stored. As another example, users may open multiple "tabs" within a single browser window or instance, with each tab having a corresponding content display pane. As with the separate window example above, the separate tabs are typically managed as separate (or substantially separate) processes on the user device, with each tab corresponding to a separate memory space on the user device.

Due to the finite amount of memory available on user devices, the number of browser instances or tabs that may be concurrently open is also finite. Some browser applications address this limitation by allowing users to open a relatively large number of browser tabs concurrently such that the maximum number of concurrent browser tabs may appear to users to be nearly infinite. When a user device runs out of memory for additional browser tabs, the browser can close (or destroy, de-allocate, decommission, etc.) a browser tab to free up memory while continuing to display an indication that the browser tab is available (e.g., display the "tab" portion of the browser tab, without a corresponding content display pane). Subsequently, when a user wishes to return to a previously opened tab that has been closed (or destroyed, de-allocated, decommissioned, etc.), the browser application can retrieve and reload the corresponding content item from a content server and display the content item again for the user.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure relates to a network content browser application that stores active content items (e.g., web pages, applications, streaming multimedia, etc.) such that the state of the content items is preserved and the content items may be subsequently restored to the same state. The network content browser application, also referred to simply as a "browser," may store the current state of a content item by saving, to persistent storage (e.g., a hard disk or other non-volatile mass storage medium), data in the volatile memory space (e.g., random access memory or "RAM") allocated to the content item. For example, the browser may use a process known as serialization to store the content state to persistent storage. As used herein, the term "serialization" refers to the general process of translating data structures and other object state data in volatile memory into a format that can be stored on a persistent storage component such that the object state may later be reconstructed ("de-serialized") in volatile memory. Such serialization preserves any changes to the state of the content item occurring after the content item was retrieved from a content server and initially displayed. The de-serialization may be performed during the same browsing session or during a subsequent browsing session, on the same computing device or on another computing device, etc. For example, a browser application may give the appearance that a large number of separate tabs, corresponding to separate content items, can be open concurrently by serializing the state of at least some of the tabs to volatile or persistent storage, and then removing the memory state data for those tabs from volatile memory (or otherwise allowing it to be overwritten) to free up space for other content items. Any serialized content items that are subsequently accessed by the user can be de-serialized and restored, in volatile memory, to the state in which the user last interacted with them, thus appearing to the user as though the content items remained in memory throughout the intervening period of time. In some embodiments, the browser application may store content to other areas of volatile memory in a format that is more efficient than the original version (e.g., in a serialized format, in a compressed format, or in some combination thereof). Storing more efficient versions of content in volatile memory can help the browser application save memory when the corresponding "original" version is removed from volatile memory or overwritten.

Some conventional browser applications allow users to open a relatively large number of content items in different browser tabs such that the maximum number of concurrent browser tabs may appear to the users to be nearly infinite. When a user device runs out of memory for additional content items, the conventional browsers typically close or otherwise remove one or more content items from memory while continuing to display an indication that the content items are available (e.g., display the title or name portion of the browser tabs without any corresponding content display pane). Subsequently, when a user wishes to return to a tab corresponding to a content item that has been closed or otherwise removed from memory, the browser can retrieve and reload the corresponding content item from a content server and display the content item again for the user. However, the state of the content item is not preserved when the content item is simply removed from memory without any state information being stored. In such cases, retrieving and reloading the corresponding content item from the content server causes the content item to be presented as if the user had not previously interacted with the page. Therefore, any information entered by the user or other interactions performed by the user will not be reflected in the reloaded content item, and any other change to the content item state will not be reflected in the reloaded page.

Some aspects of the present disclosure relate to the automatic serialization of data in memory allocated to content items, and the automatic de-serialization of the data in response to the occurrence particular events. In some embodiments, a browser may have a multi-tabbed interface in which multiple content items may be open concurrently. If the device on which the browser is executing does not have or provide enough memory for additional content items to be opened, the browser or operating system can close a tab or otherwise remove a content item from memory to free up memory for additional content items. However, the browser may also serialize the memory space of the content items on a predetermined or dynamically determined schedule, or in response to tab-close events. Therefore, the browser can still provide some indication that the closed tab is available, and if the user subsequently activates the tab, the corresponding content item can be de-serialized and restored to its previous state. To more efficiently manage the serialization process, the memory space of the content items may not be repeatedly serialized in their entirety, but rather only those portions of the content items that have changed since the last serialization process may be serialized during any given serialization procedure. Such incremental serialization can reduce the time and computing resources required to serialize content items in the background, ensuring that the user experience with actively displayed content items remains acceptable. In addition, such incremental serialization can be used when a content item is dynamically removed from memory to make room for another content item. Because a large portion of content item state data to be removed from memory has likely been serialized during the ongoing serialization process, only data which has changed since the last scheduled serialization needs to be stored before the content item is removed from memory.

Additional aspects of the present disclosure relate to content item serialization techniques. In some embodiments, a browser application may automatically flag individual objects that make up a content item when the state of those objects has changed. For example, objects may expose methods by which the state of the objects can be programmatically queried (via a "get" method for each property of the object) or changed (via a "set" method for each property of the object). When a "set" method is called, the object may be flagged (e.g., setting a "dirty" flag, incrementing a generational identifier, etc.) to indicate that the state of the object has been changed. Then, during a subsequent serialization process (whether scheduled or dynamically initiated), the browser may serialize the state of only those objects which have been flagged (e.g., flagged as "dirty" or given a generational identifier that is greater than the most-recently serialized version). In additional embodiments, a browser may implement pointer management techniques to track and maintain references between objects when the objects are serialized. Pointers indicate specific locations in volatile memory at which data of interest may be obtained. For example, a table displayed on a content page may include an image as part of its display, and the memory space of the table may include a pointer to the memory space of the image. When the table and image objects are serialized, the pointer to the image becomes invalid because it refers to a location in volatile memory that may have been overwritten. The browser application can substitute a custom identifier for the memory pointer. In further embodiments, a browser may serialize content items such that the portion of the content item that was last visible may be quickly restored and displayed when the content item is de-serialized. For example, the portion that is displayed (or which was displayed when the content item was last active) can be identified and serialized first such that it can subsequently be de-serialized first.

Further aspects of the present disclosure relate to content item de-serialization techniques. In some embodiments, a browser application may track the memory locations of objects that have been de-serialized. When the browser application de-serializes an object that uses an object identifier as a substitute for a pointer to reference another object (as described above) and the referenced object has already been de-serialized into memory, the browser can replace the object identifier with a valid pointer to the memory space of the referenced object. If, however, the referenced object has not yet been de-serialized, the browser application can store information indicating that the referenced object is referenced in the memory space of the current object (e.g., an entry may be added to a temporary list, including a pointer to the pointer in the current object's memory space at which the referenced object is referenced). When the browser subsequently accesses the serialized data for the referenced object, the browser can allocate memory, use the serialized data to initialize the data values for the referenced object at the allocated memory space, and obtain a pointer to the allocated memory space. The browser can then use the temporary list to update the pointers of previously de-serialized objects that reference the referenced object. In some embodiments, serialized content items may be provided to or received from a different computing device, such as a server or a personal computing device. The content may then be de-serialized, on the different computing device, to the state at which it existed when it was last displayed or interacted with on the prior computing device. For example, a user may save tabs of content to a server for later access at the same computing device or on a different computing device.

Although aspects of the embodiments described in the disclosure will focus, for the purpose of illustration, on the storage of content items and preservation of content state using the process of serialization, one skilled in the art will appreciate that the examples are illustrative only, and are not intended to be limiting. In some embodiments, other techniques for preserving memory state may be used and other types of memory management may be used depending upon the computing environment (e.g., hardware and operating system), etc. Various aspects of the disclosure will now be described with regard to certain examples and embodiments, which are intended to illustrate but not limit the disclosure.

System Components

Figure 1:
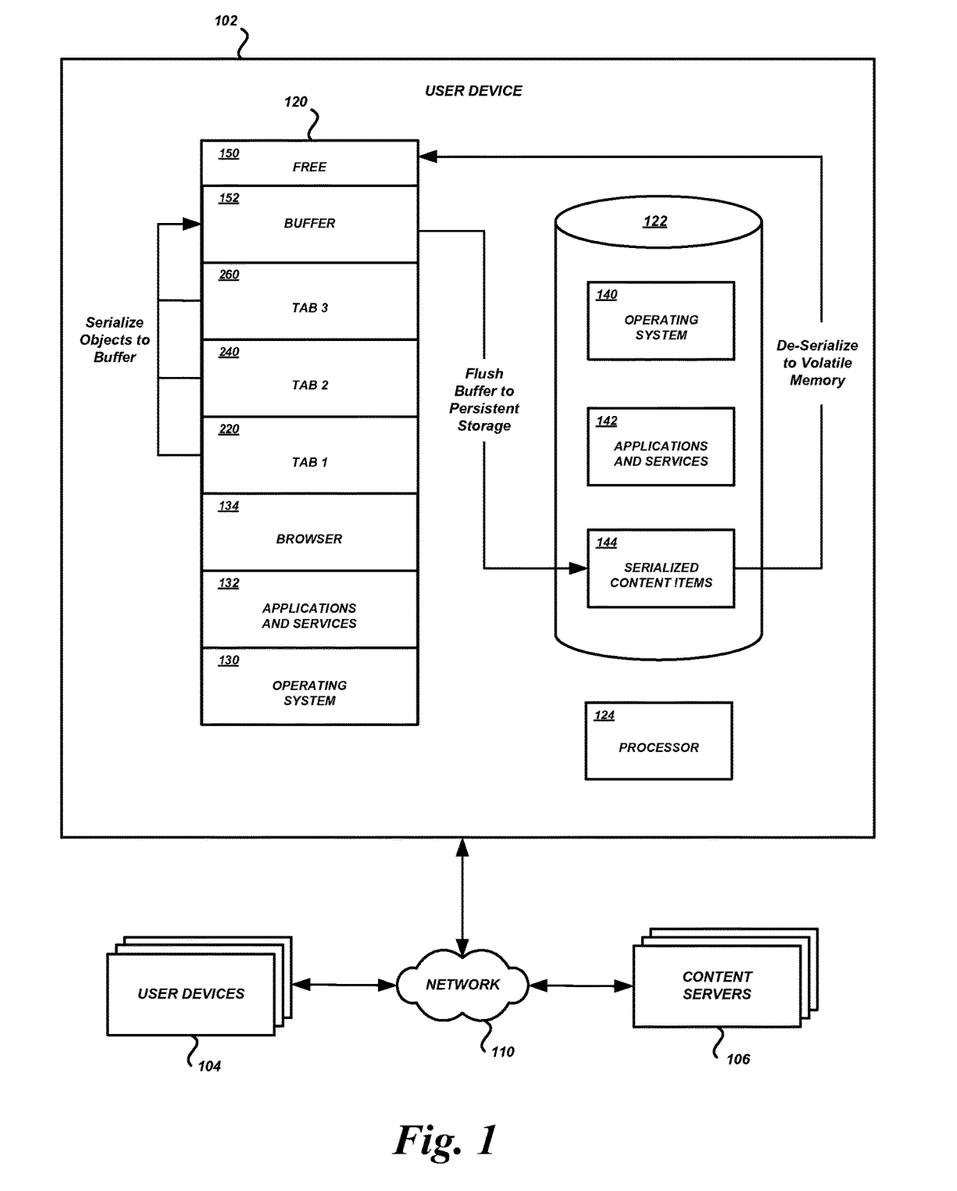
FIG. 1 illustrates a computing device with content items in volatile memory and serialized content items in persistent memory according to some embodiments.

FIG. 1 illustrates an example network environment in which features can be implemented for storing content items such that they can be restored to the same memory state at a later time. The network environment shown in FIG. 1 includes a user device 102, any number of other user devices 104, and various content servers 106, such as origin content servers and content delivery network ("CDN") servers. The devices may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The user devices 102, 104 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

Individual user devices may include volatile memory 120 (e.g., random access memory or "RAM"), persistent storage 122 (e.g., magnetic hard disk drives or flash memory), and one or more hardware processors 124 (e.g., central processing units or "CPUs'), among other components. The volatile memory 120 may store data and instructions used by the processor 124 to perform various computing tasks. For example, the volatile memory 120 may include an operating system 130, a browser application 134, and any number of other applications and services 132. As is known to those of skill in the art, the data and instructions in volatile memory 120 typically do not survive after the user device 102 has been turned off or power to the volatile memory 120 has otherwise been interrupted. The persistent storage 122 may store data and instructions on a longer-term basis than volatile storage 120, even when power is interrupted to the persistent storage 122. For example, the persistent storage 122 may store executable program files and data for the operating system 140 and various applications and services 142, including the browser application. As is known to those of skill in the art, the persistent storage 122 is typically slower than volatile storage 120, and therefore the executable program files and data in persistent storage 122 are loaded into volatile memory 120 for access/execution by the processor 124.

The content servers 106 can correspond to logical associations of one or more computing devices for hosting content and servicing requests for the hosted content over the network 110. For example, a content server 106 can include a web server component corresponding to one or more server computing devices for obtaining and processing requests for content (such as content pages) from user devices 102 and 104, or other devices or service providers. In some embodiments, one or more content servers 106 may be associated one or more CDN service providers (e.g., entities that manage multiple CDN servers), application service providers, etc.

Figure 2:
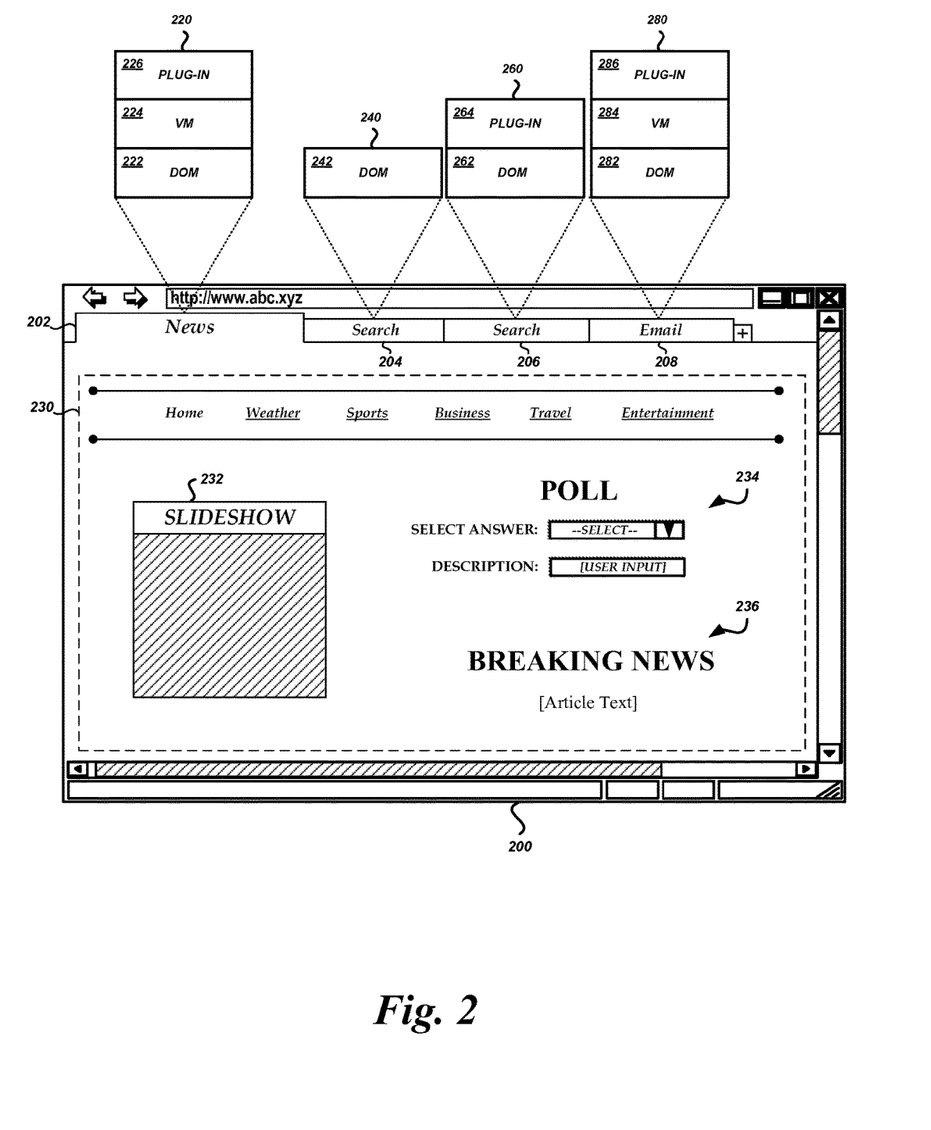
FIG. 2 illustrates a user interface with several open content items, and corresponding objects in memory for the content items according to some embodiments.

FIG. 2 illustrates an example multi-tabbed browser interface 200 in which multiple content items may be open concurrently on a user device 102. As shown, the browser interface 200 has multiple tabs 202, 204, 206, and 208 that may correspond to different content items, different versions of the same content item, or some combination thereof. For example, tab 202 corresponds to a news page, tab 204 corresponds to a search engine page, tab 206 corresponds to another search engine page, and tab 208 corresponds to an email page.

Each of the tabs may be associated with its own separate memory space (such as a separate "sandbox") within volatile memory 120 of a user device 102 on which the browser is executing. When parsed and processed for display, a single content item in a single tab may be composed of hundreds, thousands, or even millions of individual data objects in memory 120. The term "data object" (or more simply, "object") is used herein in accordance with its ordinary meaning known to those of skill in the art, and generally refers to individual data structures, variables, executable functions, etc. for which a portion of memory has been has been allocated (e.g., to store the definition of the object, data regarding the current state of the object and/or how the current state is different than the default state, etc.). For example, the memory space 220 for tab 202 includes objects that are part of or associated with a document object model ("DOM") tree 222 constructed during processing of the content item, a virtual machine 224 for executable code (e.g., a JavaScript virtual machine) included in or referenced by the content item, a plug-in 226 (e.g., a separate component that provides functionality not normally available without the plug-in), etc. The DOM tree 222 may include a separate object for each element in or referenced by a base file, such as a markup language file, that defines the content item (e.g., tables, images, text, etc.) The virtual machine 224 may include a separate object for each variable, executable function, etc. that is coded into or referenced a file of the content item. The plug-in 226 may include a separate object for each variable, executable function, etc. that is part of the plug-in 226, a separate object for each file or other portion of media that is accessed or displayed by the plug-in 226, etc.

At any given time, any number of tabs may be actively displayed and any number of tabs may be in the background. When a tab is actively displayed, a content display pane may be shown, such as the content display pane 230 shown for tab 202. The content display pane 230 can display a visual representation of the content item or some portion thereof. In addition, users may interact with the content item via the content display pane 230. For example, the content display pane 230 for the news page tab 202 may display a slide show 232, an interactive poll 234, and a text article 236. Each of these displayed items may correspond to one or more objects in the memory space 220 of the tab 202 for the content item. Illustratively, as a user advances through the slide show 232, information about the current state of various slide-show related objects may be updated in the plug-in 226 portion of the memory space 220. As the user makes selections and enters information into the interactive poll 234, information about the current state of various data-validation features may be updated in the virtual machine 224 portion of the memory space 220. The article 236 may be stored in DOM 222 portion of the memory space 220, in addition to information about user entries into the input controls of the poll 234, etc.

Process for Managing Multiple Content Items Concurrently

Figure 3:
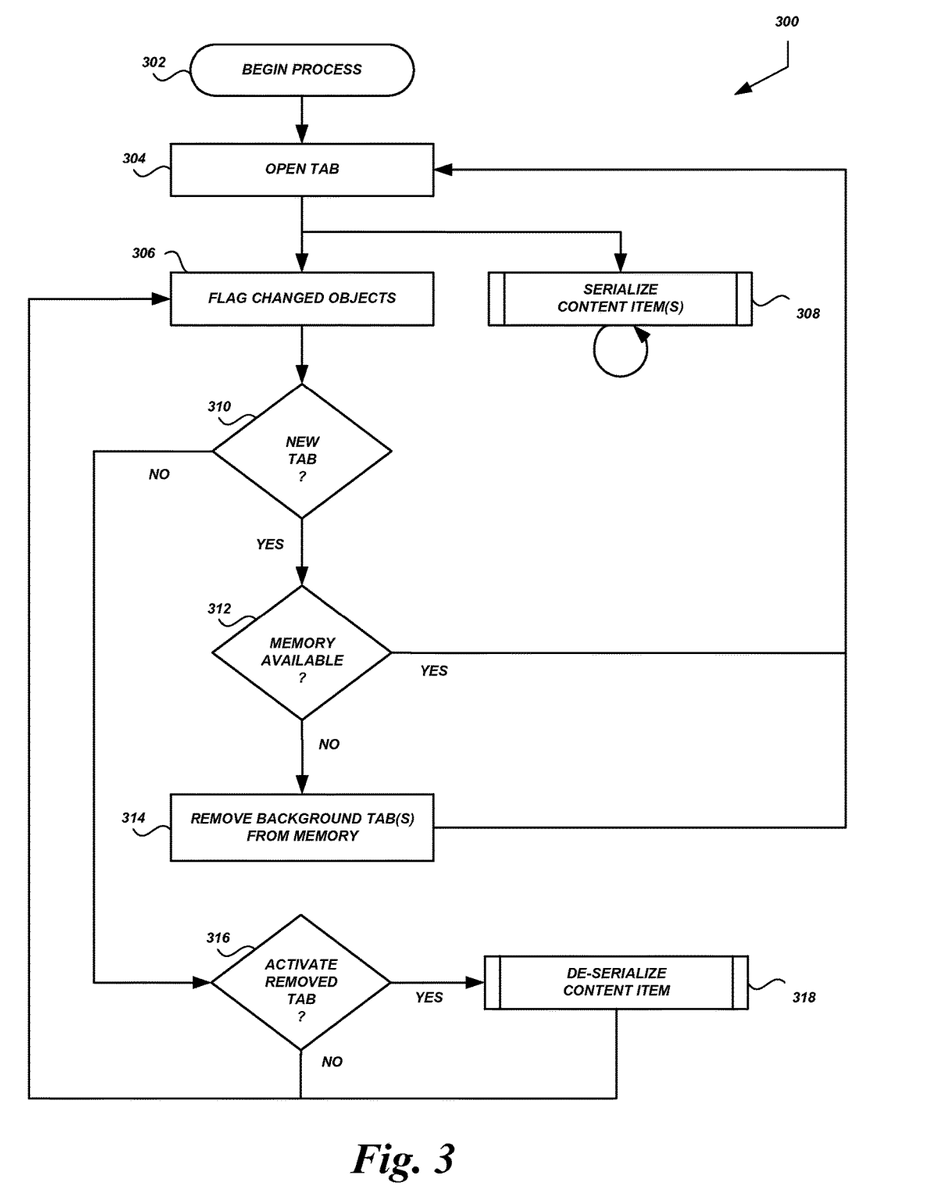
FIG. 3 is a flow diagram of an illustrative process for managing a browsing session, including the serialization and de-serialization of content items according to some embodiments.

FIG. 3 is a flow diagram of a process 300 for managing multiple content items concurrently. Advantageously, a browser executing on a user device 102 may use the process to automatically store the state of content items so that background content items may be removed from memory to make room for new content items, and the content items removed from memory may be restored, as necessary, to the state at which they existed at about the time of their removal from memory. Although process 300 is described with respect to removing or overwriting the volatile memory state of content items with memory state data for newly requested content items or newly opened tabs, some or all of the process 300 (or any other process described herein) may be used in response to other events. For example, the browser may become aware that any type of request to allocate memory has been received, rather than specifically a request for a new tab or new content item. As another example, the browser may determine that a particular tab has been open for a period of time exceeding a threshold, and that it should be removed from memory (or marked for removal). As a further example, the browser may determine that the memory under management of the browser has become fragmented, and may serialize some or all open tabs, release some or all memory corresponding to those tabs, and then de-serialize memory for some or all of the serialized tabs in a less fragmented manner.

The process 300 begins at block 302. At block 304, the browser or some other module or component of the user device 102 can open a tab for display of a content item. For example, a user may launch the browser application, and a "home page" or some other default content item may be automatically loaded for display in a first tab of the browser application. As described above and in greater detail below, the tab may be associated with its own memory space within volatile memory 120 of the user device 102, such as a sandbox within which the content item may be processed and executed without affecting the memory space of other tabs.

At block 306, the browser or some other module or component of the user device 102 can manage execution of, and user interaction with, the content item(s) for any currently open tabs. As objects of the content item have their state changed (whether through some user interaction, according to some automatic process, or in response to some event), the individual objects may be flagged so that subsequent serialization processes may know to serialize the state of the flagged objects. For example, a binary flag may be associated with each object (e.g., the interface that is exposed by each object may include "get" and "set" methods for such a flag). When the browser processes a change to the state of the object in volatile memory 120, the browser may automatically flag the object (e.g., set the flag to "true" or "dirty").

At block 308, the browser or some other module or component of the user device 102 can serialize the content items currently open in the browser application. For example, if the browser application shown in FIG. 2 has three currently open tabs 202, 204, and 206, the browser may serialize the memory allocated to each tab on a periodic basis (e.g., every 30 seconds, 1 minute, 2 minutes, 5 minutes, 10 minutes, etc.). In some embodiments, the browser application may serialize memory allocated to browser tabs in response to an event. For example, the browser may serialize the memory allocated to a particular browser tab in response to some threshold number or percentage of objects being flagged as changed. The browser may use process 400, described below, or some other method to serialize the content items to persistent storage 122.

At decision block 310, the browser or some other module or component of the user device 102 can determine whether a new tab is to be opened. For example, a user may manually initiate the process of opening up a new tab by selecting some user interface component, or a new tab may be automatically opened in response to some other event (e.g., clicking on a link in the content display pane of an existing tab that causes a linked content item to open in a new tab). If so, the process 300 can proceed to decision block 312; otherwise, the process 300 can proceed to decision block 316.

At decision block 312, the browser or some other module or component of the user device 102 can determine whether there is adequate space within volatile memory 120 available for the new tab. If there is adequate space, the process 300 can return to block 304, where the new tab is opened. However, if there is not adequate space (e.g., there are so many open tabs or other executing applications that available volatile memory 120 on the device 102 is running out), the process 300 can proceed to block 316. For example, the browser illustrated in FIG. 2 may have tabs 202, 204, and 206 open, and a user may open new tab 208. As shown in FIG. 1, the amount of free space 150 in volatile memory 120 may not be sufficient to store data for another tab.

At block 314, the browser or some other module or component of the user device 102 can select a tab to be removed from memory. In some embodiments, the browser may select a background tab that has not been accessed within a threshold period of time, a tab that has not been accessed for the longest period of time in comparison with all other background tabs currently open in the browser application, a tab that is currently occupying the most or the least memory space of all background tabs currently open, etc. For example, the browser may select tab 206 because its memory space 260 is larger and/or includes more individual objects than the memory space 240 for the other currently open background tab 204. As shown in FIG. 2, the memory space 260 for tab 206 includes both a DOM 262 and also a plug-in 264, while the memory space 240 for tab 204 includes only a DOM 242. In this example, removing tab 204 from memory may free up enough memory for only the simplest or smallest content item, and the browser may therefore select tab 206 instead. The selected tab 206 can be serialized once more to ensure that all changes have been saved. Then, the browser application may close the tab 206 or otherwise remove its corresponding state data 260 from volatile memory 120. In some embodiments, the browser may continue to display a portion of the background tab 206 (e.g., the name or title of the tab) such that a user may selected and re-load the tab, and the state of the tab can then be restored to the state in which it existed prior to being closed.

At block 316, the browser or some other module or component of the user device 102 can determine whether a tab previously removed from memory, such as tab 206, has been activated by a user or is otherwise to be restored into memory to the state at which it existed before it was removed from memory. If so, the process 300 can proceed to block 318, where the tab can be de-serialized from persistent storage 122 into volatile memory 120 as described in greater detail below with respect to FIG. 5.

Process for Serializing Content Item State

Figure 4:
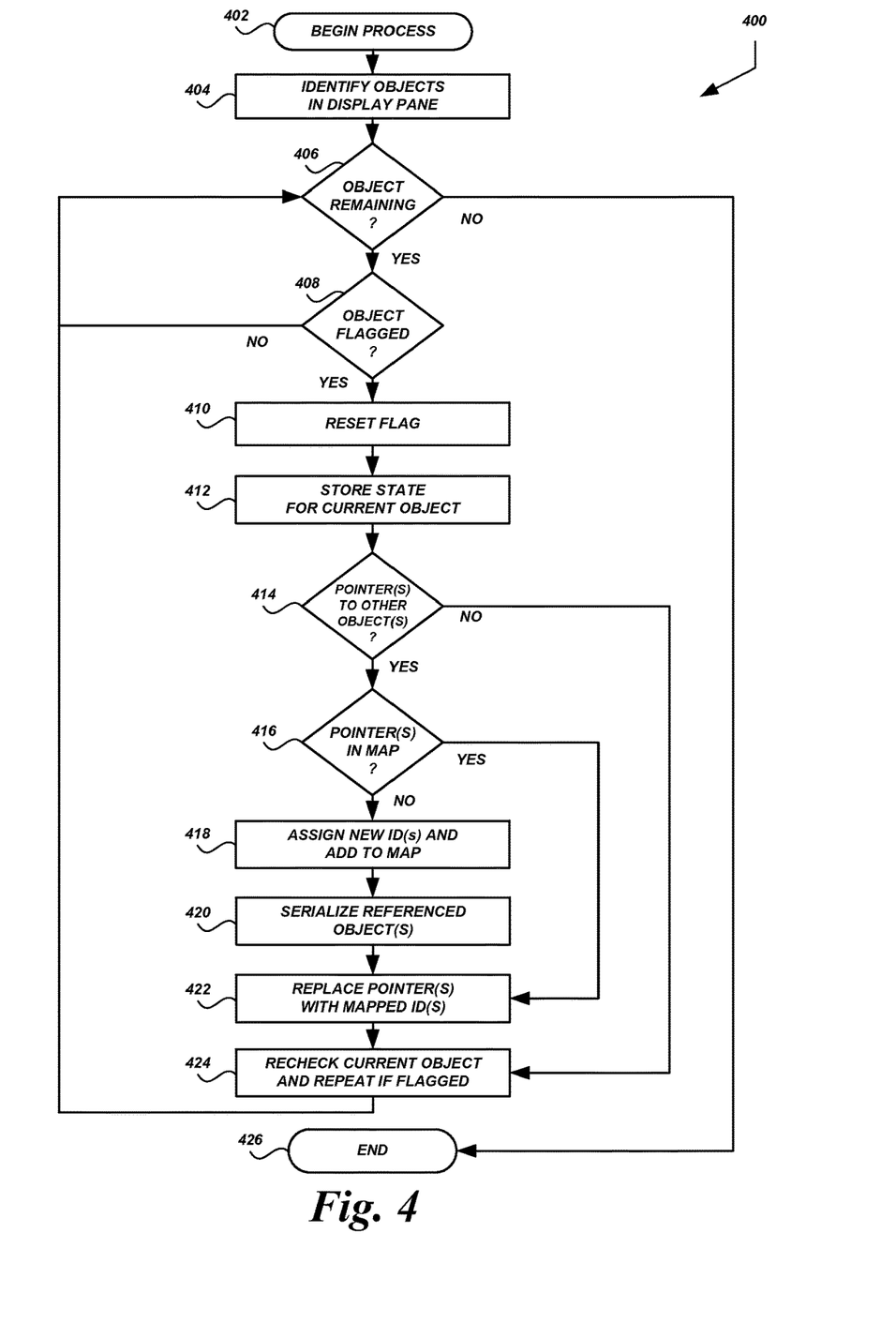
FIG. 4 is a flow diagram of an illustrative process for serializing content items according to some embodiments.

FIG. 4 is a flow diagram of a process 400 for storing content item state through serialization of the memory space allocated to the content item. Advantageously, a browser or some other module or component of a user device may serialize only those portions of the content item state that have changed since the last serialization of the content item, thereby reducing the resource requirements and other overhead associated with serialization.

The process 400 begins at block 402. At block 404, the browser or some other module or component of the user device 102 can identify the objects of the current content item that are displayed in the content display pane for the content item (or would be displayed in the content display pane if the tab for the content item was active). For example, the content display pane 230 for tab 202 includes various static and interactive objects. In addition, the content item corresponding to tab 202 may include other objects that would be visible if the user scrolled, panned, or zoomed out the display of the content item, but which are not currently displayed in the content display pane 230. The browser may identify those objects that are currently within the content display pane 230 so that they may be serialized first (and de-serialized first to reduce display latency when the content item state is restored for display). In some embodiments, the browser may choose i nodes (where i is some non-negative integer) from the DOM tree based on sampling from the content display pane 230. The browser may serialize those i nodes, and may traverse n levels deep (where n is some non-negative integer) in the DOM tree to serialize most or all of the visible content. For any remaining nodes of the content page to be serialized, the browser may begin at the root node for the page and traverse all or substantially all of the nodes of the DOM tree.

At decision block 406, the browser or some other module or component of the user device 102 can determine whether there are additional objects in the content display pane remaining to be serialized. If so, the process may proceed to block 408 for each object to be serialized. Otherwise, if all objects in the content display pane have been serialized, the browser can determine whether there are any objects outside of the content display pane, or objects which have no visual aspect at all, remaining to be serialized for the current content item. For example, the browser may begin at a root object for content item, such as a root node of the DOM, and fully traverse the DOM to identify any remaining objects to be serialized. In some embodiments, the browser may perform serialization in batches or subsets of all objects for a given content page, and then stop or pause to determine whether user-initiated actions or other actions should be processed. The browser may then return to serialization, processing the subsequent batch or subset and repeating the process until the content item has been serialized. For example, the browser can serialize i objects, where i is some non-negative integer, before stopping to perform other browser-related tasks.

In some embodiments, a particular object or group of objects may not be serialized. For example, a plug-in may not support serialization, the browser may not know how to serialize the plug-in, or it may be advantageous to keep the plug-in in a non-serialized state. In such cases, a proxy interface may be used to receive and queue communications from the plug-in to a serialized object that is being removed or may become removed from memory, overwritten, etc. When the object is subsequently restored, the communications in the queue may be provided to the restored object.

At decision block 408, the browser or some other module or component of the user device 102 can determine whether the current object has been flagged for serialization, as described in greater detail above. If so, the process 400 can proceed to block 410, where the flag can be removed or reset. Otherwise, the process 400 can return to decision block 406.

At block 412, the browser or some other module or component of the user device 102 can store the state of the current object. The browser may store the state of the current object by storing a copy of the state data using a data structure or format that supports persistent storage and/or a format that requires less space in storage (whether volatile or persistent storage). In some embodiments, the data structure may initially be written to a buffer 152 in volatile memory 120, as shown in FIG. 1. After a period of time or in response to some event (e.g., in response to determining that the buffer 152 is full), the data in the buffer 152 may be written to persistent storage 122. For example, the data may be stored in a serialized content items 144 file or data store on a hard disk (or some other non-volatile storage medium, such as non-volatile flash memory or non-volatile solid state memory) of the user device 102. In some embodiments, the data may not be stored to persistent storage, but may instead be kept in volatile storage. For example, memory state data may be serialized, compressed, and stored in volatile storage, and such memory may take significantly less space than typically required to display the corresponding object or content page as a whole. Moreover, because the content is held in volatile storage, it may be de-compressed and de-serialized more quickly than data stored to persistent storage. In additional embodiments, data saved to persistent storage 122 may be compressed to reduce the total amount of space used to save the state of content items. In additional embodiments, serialized content items may also or alternatively be transmitted to other devices, such as network storage servers or other user devices 104. In such cases, the content items may subsequently be de-serialized at the other computing devices (e.g., on one of the other user devices 104).

The browser can serialize objects to the buffer 152 in a sequential process by which the data for each object is added to the buffer 152 at the first available location, the data for the next object is added at the next available location, etc. If an object or content item is serialized again while data from the previously serialization process is still in the buffer 152, the browser may simply add a new copy of the object data to the next available location in the buffer 152, resulting in two or more copies of the object state data being present in the buffer. As long as the objects are de-serialized in the same order in which they are serialized, the newer (and presumably updated) version of the content state data will overwrite the older version of the data that was previously de-serialized. In some embodiments, the browser may maintain a map of the memory locations in the buffer 152 at which each object's state data is stored, and if a subsequent serialization process occurs for an object already serialized to the buffer 152, the browser can overwrite the older version of the object state data with the newer version, thereby reducing the duplicate objects that are stored in the buffer 152 and eventually stored to persistent storage 122, reducing the size of the serialized content item data 144 in the persistent storage 122, reducing the amount of data to be de-serialized, etc.

At decision block 414, the browser or some other module or component of the user device 102 can determine whether the current object that has been serialized uses a pointer to reference the memory space for any other objects. For example, the memory space 260 for tab 206 includes a portion allocated for the DOM 262 and a portion allocated for the plug-in 264. Within each of these portions are memory blocks for the individual objects of the DOM and plug-in, and some of those objects may reference other objects in either or both of the DOM and plugin areas of memory (e.g., the DOM is a tree structure with objects represented by nodes, and certain nodes reference other nodes via pointers, such as parent nodes referencing child nodes). The pointers reference a specific area in volatile memory 120, and there is no guarantee that the referenced objects will be de-serialized to the exact same location in volatile memory 120. Thus, the pointers will likely be invalid if they are serialized with other object data and then re-used after de-serialization. Accordingly, a substitute method should be used to retain the references between objects.

In some embodiments, pointers can be replaced with substitute unique identifiers for the pointed-to object, such as randomly or sequentially generated integers. A map, such as a binary tree or a hash table, may be maintained to map pointers to substitute identifiers. The first time a pointer to a particular memory space is identified during the serialization process for a given content item, a new identifier can be generated and mapped to the pointer using the map. The pointer can then be replaced with the identifier when the data for the current object is saved to persistent storage 122, or at some time thereafter. Subsequent objects may also include the same pointer to reference the same object's memory space. Because the pointer has already been assigned a unique identifier, it does not need to be added to the map; rather, instances of the pointer found in other objects can be replaced with the same unique identifier.

At decision block 416, the browser or some other module or component of the user device 102 can determine whether the pointer(s), identified above at block 414, have already been mapped to alternate or substitute identifiers. For example, the browser can inspect or query the map for the current content item to determine whether the pointer has already been added to the map with a substitute identifier. If so, the process may proceed to block 422. However, if a pointer identified above is not found in the map, the process may proceed to block 418, where a new identifier is generated for the pointer and the mapping of the pointer to the identifier is added to the map.

At block 420, the browser or some other module or component of the user device 102 can serialize the object(s) referenced by the pointer(s) identified above. By serializing the referenced objects at the time references to them are identified in the current object, the browser can ensure that all data necessary or desirable to properly save the state of the current object is stored. In some embodiments, portions of the process 400 may be recursive, such that serializing the referenced object(s) at block 420 involves execution of, e.g., blocks 406 through 424 of the process 400 for each referenced object. In some embodiments, the serialization of referenced objects may occur serially or in parallel with the serialization of the referencing object.

At block 422, the pointers in the serialized data for the current object can be replaced with the mapped identifiers generated or queried above. In some embodiments, the individual pointers may be replaced when they are first encountered, rather than as a separate step in which all pointers are replaced for a given object.

At block 424, the browser or some other module or component of the user device 102 can recheck the flag for the current object (just serialized, above) to determine whether the state of the object has changed during the serialization process. If so, the process may be repeated for the block until the object is not flagged at the end of serialization. The browser may perform such a re-check at the end of the serialization process because it may not have locked the memory allocated to the object during the serialization process. Locking the memory associated with objects during the serialization process can have a negative impact on the user-perceived performance of the browser and the overall user experience, because changes to content state cannot be made until the corresponding memory space is unlocked. Therefore, by flagging changed objects, resetting the flag, serializing the objects, and then re-checking the flag, the negative performance effects of locking can be avoided and the browser can still ensure that the current state of the object is serialized. In some embodiments, a browser may use a generational identifier or some similar data for each object instead of, or in addition to, a flag. For example, the browser may increment the generational ID for a given object when the browser determines that the object's memory state has changed. Then, instead of checking a binary flag at block 424, the browser can check to see if the generational ID has been incremented. If it has, the browser can repeat the serialization process for the particular object once all of the current-generation objects have been serialized. In this way, the browser can ensure that serialization of a content page can be completed, even if individual objects are continually changing memory state.

In some embodiments, there may be a need to destroy the original state of the object in volatile memory. In such cases, operations can be performed before the original state of the object (or content page/tab as a whole) is destroyed. For example, the browser may suspend any timers associated with the object and notify nodes of pending destruction. The nodes can then close network connections and/or perform other tasks. After network connections have been closed, timers have been stopped, and/or other tasks have been performed, the browser may perform one last pass of serialization (if anything is dirty). Illustratively, this notification/finalization may occur immediately before the actual original state of the tab is destroyed.

In some embodiments, memory state can be serialized in parallel for multiple objects. For example, a pool of multiple (e.g., two or more) threads may be used to serialize objects. When traversing the DOM tree, each encountered node may be added to a list. The threads of the thread pool can serialize objects in order from the list as individual threads become available (e.g., after serializing an object previously added to the list).

Process for De-Serializing Content Item State

Figure 5:
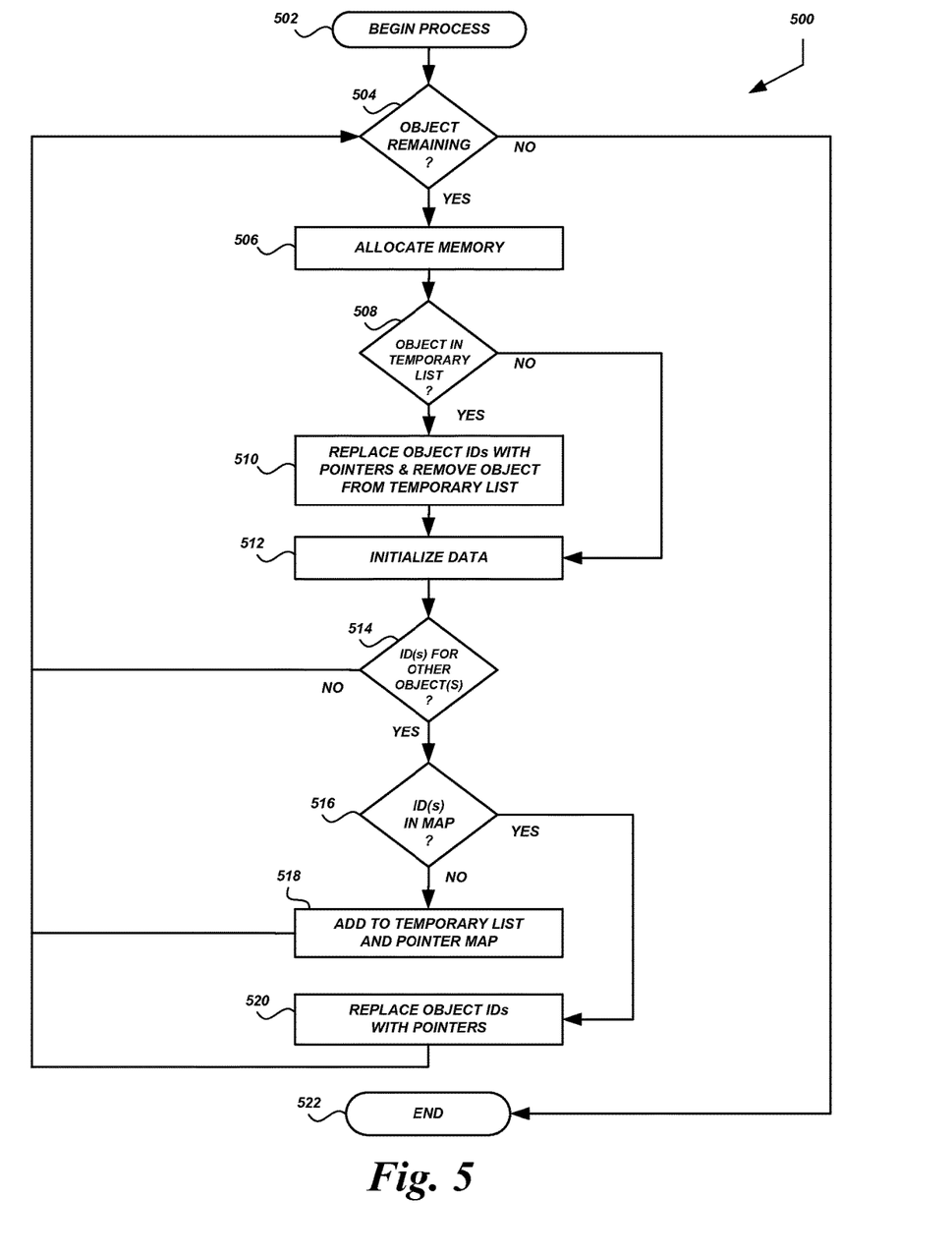
FIG. 5 is a flow diagram of an illustrative process for de-serializing content items according to some embodiments.

FIG. 5 is a flow diagram of a process 500 for restoring content item state through de-serialization of the previously stored state data. Advantageously, a browser or some other module or component of a user device may de-serialize a content item back to the state at which it existed when the content item was serialized. In addition, the content item may be de-serialized and presented to the user without requiring additional request and retrieval operations to the content server.

The process 500 begins at block 502. In some embodiments, the process 500 may be performed when a user activates a tab corresponding to a previously serialized and closed content item. In additional embodiments, the process 500 may be performed when a serialized content item is loaded on a different computing device than that on which it was serialized. For example, the process 500 may be used to de-serialize pre-parsed content items provided by a content server 106 or intermediary system (e.g., proxy server) in response to a content request from the user device 102.

At block 504, the browser or some other module or component of the user device 102 can determine whether there are any additional objects to de-serialize for the current content item. If there is a remaining object, the process 500 can proceed to decision block 506.

At block 506, the browser or some other module or component of the user device 102 can allocate memory for the current object and obtain a pointer to the allocated memory space.

At decision block 508, the browser or some other module or component of the user device 102 can determine whether the current object is listed in the temporary list, as described in greater detail below with respect to block 518. If the object is included in the temporary list indicating that objects with memory states referencing the current object have already been de-serialized, the process 500 may proceed to block 510.

At block 510, the browser or some other module or component of the user device 102 can use the temporary list to access the memory spaces of the objects referencing the current object. For example, the temporary list may include pointers to the locations in memory referencing the substitute ID for the current object (pointers to pointers). The browser can replace substitute ID values with the value for the pointer to the current object, and then remove the current object from the temporary list.

At block 512, the browser or some other module or component of the user device 102 can de-serialize the state data for the current object into the volatile memory 120 space allocated for the object. For example, the persistent data structure used to store the state data can be read, and the memory space allocated for the object can be initialized with values, instructions, and the like from the data structure.

At decision block 514, the browser or some other module or component of the user device 102 can determine whether the state data for the current object includes a unique identifier for another object, such as a substitute identifier used in place of a memory pointer as described above. If so, the process 500 can proceed to decision block 516.

At block 516, the browser or some other module or component of the user device 102 can determine, for each of the unique object identifiers included in the state data for the current object, whether a corresponding memory pointer has been determined (e.g., whether objects corresponding to the unique object identifiers have already been de-serialized into volatile memory 120 and therefore may be referenced using a memory pointer). If not, the process 500 can proceed to block 518.

At block 518, the browser or some other module or component of the user device 102 can maintain a listing of substitute identifiers referenced in the memory states of de-serialized objects such that the substitute identifiers can later be replaced with the memory pointer for the referenced object. In some embodiments, the listing may include a record for each substitution that is to be made. For example, each referenced object may be referenced by multiple de-serialized objects, and therefore the multiple substitute identifiers may be replaced per referenced object.

At block 520, the browser or some other module or component of the user device 102 may replace substitute object identifiers with the memory pointers generated or determined above. The process 500 may then return to decision block 504 for each object that remains to be de-serialized.

In some embodiments, the browser or some other module or component of the user device 102 may notify nodes of the DOM tree that deserialization is complete. If objects corresponding to the nodes were previously connected (e.g., had network sockets open prior to serialization), the connections can be re-established at this time. If re-establishment of a connection fails, the browser may proceed as though the disconnection had just occurred.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

For example, the processes 200, 400, and 500 described with respect to FIGS. 2, 4, and 5 may be embodied in a set of executable program instructions stored on one or more non-transitory computer-readable media, such as one or more disk drives or solid-state memory devices, of the user device 102 or some other computing system. When a process 200, 400, or 500 is initiated, the executable program instructions can be loaded into memory, such as RAM, and executed by one or more processors of the user device 102. In some embodiments, the computing system executing a process 200, 400, or 500 may include multiple individual processors or separate computing devices, and the processes 200, 400, and 500 or portions thereof may be executed by separate processors or computing devices, serially or in parallel.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising: as implemented by one or more computing devices configured to execute specific instructions,
    allocating different respective portions of a volatile memory to different respective tabs of a browser application, wherein each tab displays a different content item loaded by the browser application, and wherein the browser application has a user interface that enables a user to select a content item to view by selecting the tab in which the content item is loaded;
    determining that a memory state of a first content item loaded in a first tab of the browser application has changed, said memory state corresponding to a volatile memory portion allocated to the first tab;
    serializing, by the browser application, the memory state of the first content item based at least partly on the determination that the memory state of a first content item has changed, wherein serializing the memory state comprises translating object state data stored in the volatile memory portion into a format for storage in non-volatile storage, and storing the translated object state data in non-volatile storage, wherein serializing the memory state of the first content item comprises storing data regarding a memory state of one or more portions of the first content item, and wherein one or more additional portions of the content item are excluded from the serialization in response to determining that a memory state of the one or more additional portions has not changed;
    after serializing the memory state, releasing the allocation of the volatile memory portion to the first tab, such that at least a portion of the volatile memory portion is made available for use other than to store data corresponding to the first tab;
    after releasing the allocation, continuing to display a representation of the first tab in the user interface of the browser application; and
    responsive to user selection of the representation of the first tab, restoring a state of the first tab, said restoring comprising de-serializing the memory state to a portion of the volatile memory corresponding to the first tab.

2. The computer-implemented method of claim 1, wherein the method is implemented in its entirety by a single user computing device.

3. The computer-implemented method of claim 1, wherein the memory state of the first content item is serialized on a first computing device, and wherein the de-serialized first content item is displayed on a different computing device.

4. The computer-implemented method of claim 1, wherein the method comprising flagging individual portions of the first content item in response to determining that memory states of the individual portions have changed, and serializing memory states of only the changed individual portions.

5. The computer-implemented method of claim 1, wherein serializing the memory state of the first content item comprises storing data regarding a memory state of one or more portions of the first content item in a format supporting persistent storage, wherein one or more additional portions of the first content item are excluded from the serialization.

6. The computer-implemented method of claim 1, wherein serializing the memory state of the first content item comprises:
    identifying a first portion of the first content item, said first portion located within a content display pane of the first tab; and
    serializing the first portion prior to serializing a second portion of the first content item, said second portion not located within the content display pane.

7. The computer-implemented method of claim 1, wherein de-serializing the memory state of the first content item comprises:

allocating space in the volatile memory for a first portion of the first content item, wherein the space is accessible via a memory pointer; and replacing a substitute identifier in state data of a second portion of the first content item with the memory pointer.

8. The computer-implemented method of claim 1, wherein releasing the allocation of the volatile memory is performed in response to detecting a volatile memory shortage condition.

9. The computer-implemented method of claim 1, wherein the allocated portions of the volatile memory are sandboxes.

10. Non-volatile computer storage comprising one or more storage devices, the non-volatile computer storage storing a browser application comprising executable instructions that implement at least:

a user interface that enables a user to open multiple tabs, and to load different respective content items in each tab, each tab being selectable to view a corresponding content item; and a memory manager that allocates a respective portion of a volatile memory to each of the multiple tabs, and which manages the volatile memory allocations according to a process that comprises:

detecting a change in a memory state of a content item loaded in a first tab of the multiple tabs, said memory state corresponding to a volatile memory portion allocated to the first tab;

serializing the memory state based at least partly on the detected change, wherein serializing the memory state comprises translating object state data stored in the volatile memory portion into a format for storage in non-volatile storage, and storing the translated object state data in non-volatile storage; and after serializing the memory state, releasing the allocation of the volatile memory portion to the first tab, such that at least a portion of the volatile memory portion is made available for use other than to store data corresponding to the first tab;

wherein the memory manager is configured to identify individual portions of the content item that have been changed, and to limit said serialization to the individual portions that have changed;

wherein the user interface is configured to continue displaying a selectable representation of the first tab after the allocation is released, such that the first tab remains selectable by a user; and wherein the memory manager is responsive to user selection of the selectable representation of the first tab by de-serializing the memory state and restoring a state of the content item in the first tab.

11. The non-volatile computer storage of claim 10, wherein the memory manager is configured to serialize said memory state based at least partly on detection of a volatile memory shortage condition.

12. The non-volatile computer storage of claim 10, wherein said process implemented by the memory manager enables the user interface to display a number of tabs that is not limited by a size of the volatile memory.

13. A computing device comprising a processor and a volatile memory, the computing device programmed with executable instructions to implement at least:

a user interface that enables a user to open multiple tabs, and to load different respective content items in each tab, each tab being selectable to view a corresponding content item; and a memory manager that allocates a respective portion of the volatile memory to each of the multiple tabs, and which manages the volatile memory allocations according to a process that comprises:

detecting a change in a memory state of a content item loaded in a first tab of the multiple tabs, said memory state corresponding to a volatile memory portion allocated to the first tab;

serializing the memory state based at least partly on the detected change, wherein serializing the memory state comprises translating object state data stored in the volatile memory portion into a format for storage in non-volatile storage, and storing the translated object state data in non-volatile storage; and after serializing the memory state, releasing the allocation of the volatile memory portion to the first tab, such that at least a portion of the volatile memory portion is made available for use other than to store data corresponding to the first tab;

wherein the memory manager is configured to identify individual portions of the content item that have changed, and to limit said serialization to the individual portions that have changed;

wherein the user interface is configured to continue displaying a selectable representation of the first tab after the allocation is released, such that the first tab remains selectable by a user; and wherein the memory manager is responsive to user selection of the selectable representation of the first tab by de-serializing the memory state and restoring a state of the content item in the first tab.

* * * * *